United States Patent [19]

Rühl et al.

[11] Patent Number: 5,338,434
[45] Date of Patent: Aug. 16, 1994

[54] PROCESS FOR THE COATING OF ELECTRICALLY CONDUCTIVE SUBSTRATES AND A CATHODICALLY DEPOSITABLE AQUEOUS ELECTROCOATING PAINT

[75] Inventors: Dieter Rühl, Münster; Klaus Arlt, Senden; Ulrich Heilmann; Ulrich Heimann, both of Münster; Udo Höffmann, Drensteinfurt, all of Fed. Rep. of Germany

[73] Assignee: BASF Lacke & Farben Aktiengesellschaft, Munster, Fed. Rep. of Germany

[21] Appl. No.: 946,374

[22] PCT Filed: Apr. 25, 1991

[86] PCT No.: PCT/EP91/00803
§ 371 Date: Jan. 11, 1993
§ 102(e) Date: Jan. 11, 1993

[87] PCT Pub. No.: WO91/18063
PCT Pub. Date: Nov. 28, 1991

[30] Foreign Application Priority Data

May 16, 1990 [DE] Fed. Rep. of Germany ....... 4015703

[51] Int. Cl.$^5$ ............................ C09D 5/44; C09D 5/08
[52] U.S. Cl. .................................... 205/229; 205/316; 205/333; 106/14.05; 106/14.21; 106/490
[58] Field of Search ............... 106/14.05, 14.21, 14.44, 106/490; 428/405; 205/229, 224, 316, 333, 199, 204

[56] References Cited

U.S. PATENT DOCUMENTS

| | | | |
|---|---|---|---|
| 3,922,253 | 11/1975 | Jerabek et al. | 528/45 |
| 4,017,438 | 4/1977 | Jerabek et al. | 523/420 |
| 4,031,050 | 6/1977 | Jerabek | 523/415 |
| 4,038,232 | 7/1977 | Bosso et al. | 523/410 |
| 4,101,486 | 7/1978 | Bosso et al. | 523/415 |
| 4,104,147 | 8/1978 | Marchetti et al. | 204/181.7 |
| 4,704,414 | 11/1987 | Kerner et al. | 106/490 |
| 4,921,540 | 5/1990 | Gawol et al. | 106/14.05 |
| 5,200,440 | 4/1993 | Takego et al. | 106/490 |

FOREIGN PATENT DOCUMENTS 2513608 10/1976 Fed. Rep. of Germany ...... 106/490
9002779 3/1990 World Int. Prop. O. .

Primary Examiner—Anthony Green
Attorney, Agent, or Firm—Anne G. Sabourin

[57] ABSTRACT

The invention relates to aqueous electrocoating paints which contain 2 to 10% by weight of an anticorrosive pigment based on zinc silicate in combination with 1 to 15% by weight of a very fine quartz powder or cristobalite powder coated with epoxysilane or aminosilane, the percentages by weight being based on the total solids content of the electrocoating paint and the anticorrosive pigment being preparable by fusing together 35 to 65% by weight of ZnO, 15 to 35% by weight of $SiO_2$ and 0 to 20% by weight of $B_2O_3$ and/or 0 to 20% by weight of $WO_3$ and/or 0 to 20% by weight of $MoO_3$ and/or 0 to 20% by weight of $SnO_2$, the components being fused together using at least one of the cited oxides besides ZnO and $SiO_2$ in such a manner that the percentages by weight always total 100.

13 Claims, No Drawings

PROCESS FOR THE COATING OF ELECTRICALLY CONDUCTIVE SUBSTRATES AND A CATHODICALLY DEPOSITABLE AQUEOUS ELECTROCOATING PAINT

The invention relates to a process for the coating of electrically conductive substrates, in which
(1) the electrically conductive substrate is immersed in an aqueous electrocoating paint,
(2) the substrate is connected as cathode,
(3) a film is deposited on the substrate using direct current,
(4) the coated substrate is removed from the electrocoating paint and
(5) the deposited paint film is baked.

The invention also relates to a cathodically depositable aqueous electrocoating paint.

The cathodic electrocoating painting process described above is known (cf. for example DE-A-3,518,732, DE-A-3,518,770, EP-A-4,090, EP-A-12,463 and EP-A-262,069) and is employed in particular for the priming of automobile bodies.

Very high-quality finishes can be obtained by the cathodic electrocoating process, especially by using electrocoating paints containing cationic, amine-modified epoxy resins as binders.

The electrocoating paints under discussion contain lead pigments to increase their anticorrosive effect. These pigments are toxicologically and ecologically not unobjectionable. A declared aim of paint manufacturers is to replace lead anticorrosive pigments with lead-free anticorrosive pigments. Although many lead-free anticorrosive pigments are known, this aim has so far not been achieved. The reason for this lies in the fact that replacement of lead anticorrosive pigments always results in impairment of the anticorrosive effect and/or the flexibility in bending and/or the adhesion and/or the impact resilience of the resultant finishes and/or the flow-out characteristics and/or the throwing power of the electrocoating paints. Even the lead-free anticorrosive pigments disclosed in DE-A-3,532,806, based on zinc silicate modified with $B_2O_3$ and/or $WO_3$ and/or $MoO_3$ and/or $SnO_2$ are no exception, although they are also recommended for use in electrocoating paints.

Many attempts have been made to compensate for the impairment of the paint characteristics arising when lead anticorrosive pigments are replaced with lead-free anticorrosive pigments by modifying the chemical structure of the principal binders and/or of the crosslinking agent and/or of the grinding resin and/or by varying the amounts of principal binder and/or of crosslinking agent and/or of grinding resin used and/or by varying the type and amount of the pigments and/or fillers used and/or by adding special additives. These attempts have so far produced only unsatisfactory results.

The object of the present invention is an improvement of the process described above for coating electrically conductive substrates. The object of the present invention is especially the provision of electrocoating paints which are suitable for the above process and in which lead anticorrosive pigments have been completely or at least partially replaced by lead-free anticorrosive pigments, the drawbacks described above occurring only to a reduced extent, if at all.

Surprisingly, this object is achieved by a process as classified in the preamble of claim 1, in which the aqueous electrocoating paint contains 2 to 10, preferably 4 to 6%, by weight of an anticorrosive pigment based on zinc silicate in combination with 1 to 15, preferably 2 to 4%, by weight of a very fine quartz powder or cristobalite powder coated with epoxysilane or aminosilane, the percentages by weight being based on the total solids content of the electrocoating paint and the anticorrosive pigment being preparable by fusing together 35 to 65% by weight of ZnO, 15 to 35% by weight of $SiO_2$ and 0 to 20% by weight of $B_2O_3$ and/or 0 to 20% by weight of $WO_3$ and/or 0 to 20% by weight of $MoO_3$ and/or 0 to 20% by weight of $SnO_2$, the components being fused together using at least one of the cited oxides besides ZnO and $SiO_2$ in such a manner that the percentages by weight always total 100.

Surprisingly, when the electrocoating paints according to the invention are used, finishes are obtained which are equivalent in quality to the finishes obtained with electrocoating paints containing lead pigments.

The use of very fine quartz powder or wollastonite powder with surfaces treated with epoxysilane as anticorrosive fillers in non-aqueous paints is described in DE-A-3,325,064. DE-A-3,325,064 provides no indication that the specific combination according to the invention of zinc silicate modified with $B_2O_3$ and/or $WO_3$ and/or $MoO_3$ and/or $SnO_2$ and very fine quartz powder or cristobalite powder with surfaces treated with epoxysilane or aminosilane can solve the problems occurring when lead anticorrosive pigments are replaced with lead-free anticorrosive pigments in aqueous electrocoating paints.

The electrocoating paints used according to the invention may in principle contain as binders any cathodically depositable non-self-crosslinking or self-crosslinking resin which is suitable for the production of electrocoating paints. The electrocoating paints used according to the invention may also contain mixtures of different cathodically depositable resins as binders.

However, the electrocoating paints which contain as binders non-self-crosslinking or self-crosslinking, preferably non-self-curing, cationic amine-modified epoxy resins are preferred. Such electrocoating paints are known and are described, for example, in DE-A-3,518,770, DE-A-3,518,732 EP-B-102,501 DE-A-2,701,002 U.S. Pat. No.4,104,147 EP-A-4,090, EP-A-12,463, U.S. Pat. No. 4,031,050, U.S. Pat. No. 3,922,253, U.S. Pat. No. 4,101,486, U.S. Pat. No. 4,038,232 and U.S. Pat. No. 4,017,438. These patents also describe in detail the preparation of the cationic amine-modified epoxy resins under discussion.

The term "cationic amine-modified epoxy resins" is understood to mean cationic reaction products obtained from
(a) modified or unmodified polyepoxides and amines.

These cationic amine-modified epoxy resins may be prepared by reacting the components (a) and (b), followed by protonization if necessary. However, it is also possible to react an unmodified polyepoxide with an amine and to subject the amine-modified epoxy resin obtained in this manner to further modifications.

The term "polyepoxides" is understood to mean compounds containing two or more epoxide groups in the molecule.

Particularly preferred components (a) are compounds which can be prepared by reacting (i) a diepoxide compound or a mixture of diepoxide compounds having an epoxide equivalent weight below 2000 with (ii) a compound containing a phenol or thiol group, which reacts monofunctionally toward epoxide groups under the given reaction conditions or a mixture of such compounds, the components (i) and (ii) being used in a molar ratio of 10:1 to 1:1, preferably 4:1 to 1.5:1, and the reaction of the component (i) with the component (ii) being carried out at 100° to 190° C., in the presence or absence of a catalyst (cf. DE-A-3,518,770).

Other particularly preferred components (a) are compounds which can be prepared by polyaddition, carried out at 100° to 195° C., in the presence or absence of a catalyst and initiated by a monofunctionally reacting initiator which contains either an alcoholic OH group, a phenolic OH group or an SH group, of a diepoxide compound and/or a mixture of diepoxide compounds, in the presence or absence of at least one monoepoxide compound, to give an epoxy resin in which diepoxide compound and initiator are incorporated in a molar ratio of greater than 2:1 to 10:1 (cf. DE-A-3,518,732).

Polyepoxides which can be employed for the preparation of the particularly preferred components (a) and even used as components (a) themselves are polyglycidyl ethers of polyphenols prepared from polyphenols and epihalohydrins. Bisphenol A and bisphenol F, for example, can be used very particularly preferably as the polyphenols. In addition, 4,4'-dihydroxybenzophenone, bis(4-hydroxyphenyl)-1,1-ethane, bis-4(hydroxyphenyl)-1,1-isobutane [sic], bis(4-hydroxy-tertiary-butylphenyl)-2,2-propane, bis(2-hydroxynaphthyl)methane, 1,5-dihydroxynaphthalene and phenolic novolac resins are also suitable.

Other suitable polyepoxides are polyglycidyl ethers of polyhydric alcohols, for example ethylene glycol, diethylene glycol, triethylene glycol, 1,2-propylene glycol, 1,4-propylene glycol, 1,5-pentanediol, 1,2,6-hexanetriol, glycerol and bis ( 4-hydroxycyclohexyl) 2,2-propane [sic].

Polyglycidyl esters of polycarboxylic acids, for example oxalic acid, succinic acid, glutaric acid, terephthalic acid, 2,6-naphthalenedicarboxylic acid and dimerized linoleic acid may also be used. Typical examples are glycidyl adipate and glycidyl phthalate.

Other suitable compounds are hydantoin epoxides, epoxidized polybutadiene and polyepoxide compounds, which are obtained by epoxidization of an olefinically unsaturated aliphatic compound.

The term "modified polyepoxides" is understood to mean polyepoxides in which some of the reactive groups have been reacted with a modifying compound.

Examples of modifying compounds are:

a) Compounds containing carboxyl groups, such as saturated or unsaturated monocarboxylic acids (for example benzoic acid, linseed oil fatty acid, 2-ethylhexanoic acid and versatic acid), aliphatic, cycloaliphatic and/or aromatic dicarboxylic acids of various chain lengths (for example adipic acid, sebacic acid, isophthalic acid or dimeric fatty acids), hydroxyalkylcarboxylic acids (for example lactic acid and dimethylolpropionic acid) and polyesters containing carboxyl groups, or b) compounds containing amino groups, such as diethylamine or ethylhexylamine or aliamines with secondary amino groups, for example N,N'-dialkyl-alklenediamines [sic], such as dimethylethylenediamine, N,N'-dialkylpolyoxyalkyleneamines, such as N,N'-dimethylpolyoxypropylenediamine, cyanoalkylated alkylenediamines, such as bis-N,N'-cyanoethylethylenediamine, cyanoalkylated polyoxyalkyleneamines such as bis-N,N'-cyanoethylpolyoxypropylenediamine, polyaminoamides, such as versamides, in particular reaction products containing terminal amino groups and obtained from diamines (for example hexamethylenediamine), polycarboxylic acids, in particular dimeric fatty acid and monocarboxylic acids, in particular fatty acids or the reaction product of one mol of diaminohexane with two mol of monoglycidyl ether or monoglycidyl ester, in particular glycidyl esters of α-branched fatty acids such as versatic acid, or c) compounds containing hydroxyl groups, such as neopentyl glycol, bis-ethoxylated neopentyl glycol, neopentyl glycol hydroxypivalate, dimethyl-hydantoin-N,N-diethanol, 1,6-hexanediol, 2,5-hexanediol, 1,4-bis (hydroxymethyl )cyclohexane, 1,1-isopropyl idene-bis (p-phenoxy) - 2-propanol, trimethylolpropane, pentaerythritol or aminoalcohols such as triethanolamine, methyldiethanolamine or alkylketimines containing hydroxyl groups, such as aminomethylpropanediol-1,3-methylisobutylketimine or tris(hydroxymethyl) aminomethanecyclohexanoneketimine and also polyglycol ethers, polyester polyols, polyether polyols, polycaprolactone polyols, polycaprolactam polyols of various functionalities and molecular weights, or d) saturated or unsaturated methyl esters of fatty acids which are esterified with hydroxyl groups of the epoxy resins in the presence of sodium methylate.

Primary and/or secondary amines may be used as the component (b).

The amine should preferably be a water-soluble compound. Examples of such amines are monoalkylamines and dialkylamines, such as methylamine, ethylamine, propylamine, butylamine, dimethylamine, diethylamine, dipropylamine, methylbutylamine and the like. Alkanolamines, for example methylethanolamine, diethanolamine and the like, are likewise suitable. Compounds which are also suitable are dialkylaminoalkylamines, for example dimethylaminoethylamine, diethylaminopropylamine, dimethylaminopropylamine and the like. Amines containing ketimine groups, for example the methylisobutyldiketimine of diethylenetriamine, may also be used. Low-molecular amines are used in most cases, but it is also possible to use higher-molecular monoamines.

The amines may also contain other groups, but these must not interfere with the reaction of the amine with the epoxide group or lead to gelling of the reaction mixture.

Secondary amines are preferably used as components (b).

The charges required for water-thinnability and electrical deposition may be produced by protonation using water-soluble acids (for example boric acid, formic acid, lactic acid and preferably acetic acid).

Another possibility for introducing cationic groups into the component (a) involves the reaction of epoxide groups of the component (a) with amine salts.

The cationic amine-modified epoxy resins may be employed both as non-self-crosslinking resins and as self-crosslinking resins. Self-crosslinking cationic amine-modified epoxy resins may be obtained, for example, by chemically modifying the cationic amine-modified epoxy resins. One example of a way of obtaining a self-crosslinking system is to react the cationic amine-modified epoxy resin with a partly blocked polyisocyanate which has on average one free isocyanate group per molecule and whose blocked isocyanate groups become unblocked only at elevated temperatures.

The preferred electrocoating paints contain blocked polyisocyanates as crosslinking agents.

Any polyisocyanates whose isocyanate groups have been reacted with a compound in such a way that the blocked polyisocyanate formed is unreactive toward hydroxyl and amino groups at room temperature, but becomes reactive at elevated temperatures, usually in the range from about about [sic] 90° C. to about 300° C., may be used as blocked polyisocyanates. To prepare the blocked polyisocyanates any organic polyisocyanates which are suitable for the crosslinking may be used. Isocyanates which contain about 3 to 36, in particular about 8 to 15, carbon atoms are preferred. Examples of suitable diisocyanates are hexamethylene diisocyanate, 2,4-tolylene diisocyanate, 2,6-tolylene diisocyanate and 1-isocyanatomethyl-isocyanato-5- 1,3,3-trimethylcyclohexane. Polyisocyanates of higher isocyanate functionality may also be used. Examples of these are trimerized hexamethylene diisocyanate and trimerized isophorone diisocyanate. Furthermore, mixtures of polyisocyanates may also be used. The organic polyisocyanates which according to the invention are suitable as crosslinking agents may also be prepolymers which are derived, for example, from a polyol including a polyether polyol or a polyester polyol.

Any suitable aliphatic, cycloaliphatic or aromatic alkyl monoalcohols may be employed for the blocking of the polyisocyanates. Examples of these are aliphatic alcohols such as methyl, ethyl, chloroethyl, propyl, butyl, amyl, hexyl, heptyl, octyl, nonyl, 3,3,5-trimethylhexyl, decyl and lauryl alcohol, cycloaliphatic alcohols such as cyclopentanol and cyclohexanol, and aromatic alkyl alcohols such as phenylcarbinol and methylphenylcarbinol.

Other suitable blocking agents are hydroxylamines, such as ethanolamine, oximes, such as methyl ethyl ketoxime, acetoxime and cyclohexanone oxime or amines, such as dibutylamine and diisopropylamine. The cited polyisocyanates and blocking agents may also be used in suitable proportions for the preparation of the partly blocked polyisocyanates referred to above.

The crosslinking agent is usually employed in an amount of 5 to 60% by weight, preferably 20 to 40% by weight, based on the cationic amine-modified epoxy resin.

It is an essential part of the invention that in the process under discussion an electrocoating paint is used which contains 2 to 10, preferably 4 to 6%, by weight of an anticorrosive pigment based on zinc silicate in combination with 1 to 15, preferably 2 to 4%, by weight of a very fine quartz powder or cristobalite powder coated with epoxysilane or aminosilane, the percentages by weight being based on the total solids content of the electrocoating paint and the anticorrosive pigment being preparable by fusing together 35 to 65% by weight of $ZnO$, 15 to 35% by weight of $SiO_2$ and 0 to 20% by weight of $B_2O_3$ and/or 0 to 20% by weight of $WO_3$ and/or 0 to 20% by weight of $MoO_3$ and/or 0 to 20% by weight of $SnO_2$, the components being fused together using at least one of the cited oxides besides $ZnO$ and $SiO_2$ in such a manner that the percentages by weight always total 100.

The anticorrosive pigments usable according to the invention and their preparation are described in DE-A-3,532,806.

They are anticorrosive pigments based on zinc silicate which is modified by oxidic complexing agents or oxides capable of forming complex polyacids or heteropoly acids.

The anticorrosive pigments under discussion can be prepared by fusing 35 to 65% by weight of $ZnO$, 15 to 35% by weight of $SiO_2$ and 0 to 20% by weight of $B_2O_3$ and/or 0 to 20% by weight of $WO_3$ and/or 0 to 20% by weight of $MoO_3$ and/or 0 to 20% by weight of $SnO_2$, the components being fused together using at least one of the cited oxides besides $ZnO$ and $SiO_2$ in such a manner that the percentages by weight always total 100.

Suitable anticorrosive pigments can be obtained from $ZnO$, $SiO_2$ and $B_2O_3$. If one or more of the oxides $WO_3$, $MoO_3$ and $SnO_2$ are also to be used, then $B_2O_3$ is also preferably always to be used in an amount of 5 to 20, in particular 5 to 10%, by weight. Preferred anticorrosive pigments can be prepared by fusing together 40 to 60% by weight of $ZnO$, 15 to 25% by weight of $SiO_2$ and 5 to 20% by weight, preferably 5 to 10% by weight, of $B_2O_3$ with at least one of the oxides $WO_3$, $MoO_3$ and $SnO_2$ in an amount of 5 to 10% by weight for $WO_3$, 5 to 15% by weight for $MoO_3$ and 5 to 10% by weight for $SnO_2$. The anticorrosive pigments used very particularly preferably are those which can be prepared by fusing together 50 to 57, preferably 53 to 54%, by weight of $ZnO$, 25 to 32, preferably 28 to 29%, by weight of $SiO_2$, 9 to 12, preferably 10 to 11%, by weight of $B_2O_3$ and 6 to 9, preferably 7 to 8%, by weight of $WO_3$.

The anticorrosive pigments used according to the invention can be prepared by fusing together the starting materials at temperatures of 1100° to 1400° C., preferably at 1200° C. The fusion process should expediently take 1 to 3 hours, preferably about 2 hours.

The products thus obtained are cooled, granulated and then wet-ground to the required fineness, for example in a ball mill or vibrating mill. The product is preferably granulated by being poured from the fused mass into water. Wet grinding at a solids content of about 70% to the desired fineness causes a partial hydrolysis to molecules containing water of hydration which may have an advantageous effect on the formation of adhesion complexes in combination with corresponding binders and the metal substrate. In addition, an advantage of this process is to be seen in the fact that the pigments can be obtained as pastes rich in solids and in this way the primary particle size and particle fineness are retained and no agglomerates such as those occurring in drying processes can form.

The pigments described above can be obtained from Heubach GmbH & Co. KG, 3394 Langelsheim.

The very fine quartz powders or cristobalite powders usable according to the invention and coated with epoxysilane or aminosilane are very fine quartz powders or cristobalite powders which can be prepared by grinding quartz or cristobalite and subsequently coating their surfaces with epoxysilanes or aminosilanes. Such very fine powders are known (cf. for example Skudelny, D.: Silianisierte Füllstoffe und ihre Einsatzgebiete [Silianized [sic] fillers and their areas of application], Kunststoffe 77 (1987) 11, pp. 1153-1156 ) and are commercially available (for example SILBOND ®800 AST, SILBOND ® 800 EST, SILBOND ® 4000 AST and SILBOND ® 6000 EST from Quarzwerke GmbH). The compound

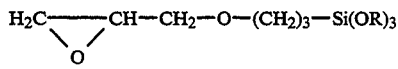

is usually used as the epoxysilane and the compound $H_2N-(CH_2)_3Si(OR)_3$ is usually used as the aminosilane, R representing a methyl or an ethyl group. The quartz powders and cristobalite powders used should be in the particle size range below 15, preferably below 10, μm.

The $SiO_2$ content of the quartz powders or cristobalite powders used should be over 95% by weight, preferably over 97% by weight. The specific surface area of the quartz powders or cristobalite powders used may be between 3.0 and 6.0, preferably between 4.0 and 5.0, $m^2/g$ (BET, DIN 66132).

Quartz powders and cristobalite powders of the type described above can be obtained from Quarzwerke GmbH, 5020 Frechen.

The term "total solids content of the electrocoating paint" is understood to mean the total amount of nonvolatile components which remains when the electrocoating paint is "dried" for two hours at 130° C.

The incorporation of the combination according to the invention of anticorrosive pigment and coated quartz powder or cristobalite powder can be carried out by well known methods. It is preferred to incorporate the combination according to the invention into a pigment paste and then to incorporate this pigment paste into an aqueous dispersion of the cathodically depositable resin and, if present, crosslinking agent.

The preparation of pigment pastes is generally known and need not be elucidated here in greater detail (cf. D.H. Parker, Principles of Surface Coating Technology, Intercience [sic]Publishers, New York (1965); R.L. Yates, Electropainting, Robert Draper Ltd., Teddington/England (1966); H.F. Payne, Organic Coating Technology, Volume 2, Wiley and Sons, New York (1961)).

In addition to the combination according to the invention, the pigment pastes may in principle contain any pigments suitable for electrocoating paints. Titanium dioxide is generally the sole or the main white pigment. However, other white pigments or extenders, such as antimony oxide, zinc oxide, barium carbonate, porcelain, clay, calcium carbonate, aluminum silicate and magnesium silicate may also be used. Cadmium yellow, cadmium red, carbon black, phthalocyanine blue, chrome yellow, toluidiyl [sic] red and hydrated iron oxide, for example, may be used as color pigments.

In addition to the pigments, the pigment paste may also contain plasticizers, fillers, wetting agents etc.

In addition to the cathodically depositable resin and the pigment paste, the electrocoating paints used according to the invention may also contain further conventional additives, for example supplementary solvents, antioxidants, surfactants etc.

The solids content of the electrocoating paints used according to the invention is preferably 7 to 35 parts by weight, particularly preferably 12 to 25 parts by weight. The pH of the electrocoating paints is between 6 and 8, preferably between 6.5 and 7.5.

The electrocoating paint is brought into contact with an electrically conducting anode and with the electrically conductive substrate connected as cathode. When electric current passes between anode and cathode, a strongly adhering paint film is deposited on the cathode.

The applied voltage may fluctuate within a wide range and may lie, for example, between two and a thousand volts. However, typical operating voltages are between 50 and 500 volts. The current density is usually between 10 and 100 amperes/$m^2$. Current density tends to fall off in the course of the deposition.

After deposition, the coated object is rinsed and is ready for baking.

The deposited paint films are generally baked at temperatures of 130° to 200° C. over a period of 10 to 60 minutes, preferably at 150° to 180° C. over a period of 15 to 30 minutes.

The process according to the invention may be used for the coating of any electrically conducting substrate, but particularly for the coating of metals such as steel, aluminum, copper and the like.

The invention is elucidated in greater detail in the examples below. All parts and percentages are by weight, unless expressly stated otherwise.

1. PREPARATION OF AN AQUEOUS RESIN DISPERSION BASED ON A CATIONIC AMINE-MODIFIED EPOXY RESIN

1.1 Preparation of an Amine-Modified Epoxy Resin 1818 g of Epikote 1001 (EEW (epoxide equivalent weight) 490 from Shell), 243 g of dodecylphenol and 108 g of xylene are introduced into a reaction vessel and fused at 110° C. in an inert gas atmosphere. Traces of water are then continuously removed under a slight vacuum. 3.3 g of N,N-dimethylbenzylamine are then added, the reaction mixture is heated to 130° C., and this temperature is maintained for about 3 hours until the EEW has risen to 1110. The mixture is then cooled and 135 g of butyl glycol, 136 g of diethanolamine and 239 g of xylene are added in rapid succession. The temperature rises for a brief period. The reaction mixture is then allowed to cool to 90° C. and is kept at this temperature for a further 30 minutes. The mixture is then further diluted by the addition of 135 g of propylene glycol monophenyl ether and 340 g of isobutanol, and is cooled to 65° C. 43 g of N,N-dimethylaminopropylamine are then added to the mixture, and the reaction is allowed to proceed for 3 hours at 80° C. The resin solution has a solids content of 70% by weight, a base content of 0.96 meq/g and a viscosity of 4.2 dPas (40% in Solvenon PM, plate-cone viscometer at 23° C.).

1.2 Preparation of a Crosslinking Agent 1133 g of tolylene diisocyanate (mixture consisting of about 80% of the 2,4 and 20% of the 2,6 isomer) and 356 g of methyl isobutyl ketone are introduced in an atmosphere of nitrogen into a reactor fitted with a stirrer, a reflux condenser, an internal thermometer and an inert gas feed. 0.7 g of dibutyltin dilaurate is added and 290 g of trimethylolpropane are added in small portions at equal intervals over 4 hours. The cooling is controlled in such a manner that the temperature of the reaction mixture does not exceed 45° C. 30 minutes after the addition of the last portion of trimethylolpropane an NCO equivalent weight of 217 (based on solids) is found. 722 g of n-propyl glycol are then added dropwise over 1 hour with further cooling. At the end of the addition the temperature has risen to 86° C. The mixture is then heated to 100° C. and the reaction is allowed to proceed for a further hour. The subsequent check reveals that no NCO groups are any longer detectable. The mixture is cooled and diluted with 500 g of methyl isobutyl ketone. The solution of this polyurethane crosslinking agent has a solids content of 69.8% by weight (measured for 1 hour at 130° C.).

Preparation of an Aqueous Resin Dispersion 1120 g of resin from section 1.1 and 420 g of crosslinking agent from section 1.2 are stirred together at room temperature. When the mixture has become homogeneous (15 minutes), 2.2 g of an antifoam solution[1]) and 18 g of glacial acetic acid are added with stirring, followed by 678 g of deionized water added in 4 portions. The mixture is then diluted with a further 1154 g of deionized water added in small portions.

[1]) Surfynol ® (commercial product from Air Chemicals), 50% solution in ethylene glycol monobutyl ether.

The resultant aqueous dispersion is freed from low-boiling solvents by vacuum distillation, diluted with deionized water to a solids content of 33% by weight and filtered.

2. PREPARATION OF PIGMENT PASTES

2.1 Preparation of a Grinding Resin 27.81 parts of bisphenol A diglycidyl ether, 1.44 parts of xylene and 5.81 parts of bisphenol A are allowed to react in the presence of 0.002 part of triphenylphosphine at 150°–160° C. until an EEW (epoxide equivalent weight) of 345 is reached. The mixture is then diluted with 21.61 parts of butyl glycol and cooled to 49° C. A mixture of 7.77 parts of 9-amino-3,6-dioxanonan-1-ol and 4.07 parts of N,N-dimethylaminopropylamine is then added over 6 minutes, whereupon the temperature rises to 110° C. The mixture is kept for 1 hour between 110° and 115° C., after which 6.45 parts of butyl glycol are added and the mixture is cooled to 77° C. 14.9 parts of nonylphenol glycidyl ether are then added. The temperature thereupon rises to 90° C. and is maintained there for 1 hour, after which the mixture is diluted with 10.03 parts of butyl glycol and cooled. The solids content of the low-viscosity resin solution is about 60% by weight.

2.2 Preparation of a Pigment Paste using the Combination According to the Invention of Anticorrosive Pigment Based on Zinc Silicate and Quartz Powder Coated with Epoxysilane 20.00 parts of the grinding resin are introduced together with 20.00 parts of deionized water, 6.50 parts of a 30% strength aqueous lactic acid solution and 0.70 parts of an antifoam (Mihagan ® 6449 OSHA, commercial product from Wintershall AG) and the mixture is vigorously mixed with 33.00 parts of titanium dixoide, 10.00 parts of zinc silicate (VP 192/4[1]), 6.00 parts of Silbond ® 800 EST[2]), 2.10 parts of a catalyst (dibutyltin oxide) and 0.64 parts of carbon black. This mixture is ground in a grinding mill to a Hegman fineness of 10 to 12. 1.06 parts of deionized water are then added to obtain the desired paste consistency. The gray pigment paste has a very good shelf life.

[1]) Anticorrosive pigment based on zinc silicate; manufacturer: Heubach GmbH & Co. KG, 3394 Langelsheim, DE.

| Technical Data: | |
|---|---|
| ZnO | 53.5% |
| $B_2O_3$ | 10.5% |
| $WO_3$ | 7.5% |
| $SiO_2$ | 28.5% |
| PH [sic] | 8 |
| Conductivity | 200 μS/cm |
| Loss on ignition | 0.7% |
| Oil value | 21 g/100 g |
| Density | 3.3 g/cm³ |
| Sieve residue 32 μm | 0.1% |
| Coulter counter | |
| <20 μm | 99% |
| <16 μm | 97% |
| <10 μm | 92% |
| <5 μm | 80% |
| <3 μm | 50% |
| Average particle diameter | 4 μm |

[2]) Quartz powder coated with epoxysilane; manufacturer: Quarzwerke GmbH, 5020 Frechen, DE.

Chemical and physical characteristics:

| Chemical analysis | (% by weight) |
|---|---|
| $SiO_2$ | 97.5 |
| $Al_2O_3$ | 2.0 |
| $Fe_2O_3$ | 0.05 |
| CaO + MgO | 0.1 |
| $Na_2O + K_2O$ | 0.1 |
| Loss on ignition | 0.55 |

Particles size distribution according to Cilas

| Particle diameter | Total residue in % by volume |
|---|---|
| 8 μm | 1 |
| 6 μm | 6 ± 3 |
| 4 μm | 22 |
| 2 μm | 56 |

Specific surface area BET m²/g (DIN 66132) : 4.5
Oil value g/100 (DIN 53199): 26
Bulk density g/cm³: 0.5

2.3 Preparation of a Conventional Pigment Paste Using a Lead Anticorrosive Pigment The procedure described in 2.2 is followed. 6.76 parts of aluminum silicate and 1.60 parts of lead silicate are used instead of the combination of zinc silicate VP 192/4 and Silbond ® 800 EST. In addition the titanium dioxide content is increased to 40.64 parts.

3. Preparation and Deposition of the Electrocoating Paints 12.9 parts by weight of the pigment paste from section 2.2 or section 2.3 (comparison example) are added to 48.6 parts by weight of the dispersion from section 1.3 and the mixture is adjusted to a bath solids content of 22% by weight (2 hours, 130° C.) with deionized water.

The electrocoating paints are allowed to age for 5 days at room temperature with stirring. The deposition of the paint films is carried out for 2 minutes at 350V onto cathodically connected zinc phosphated steel panels and onto cathodically connected unpretreated steel panels. The bath temperature is maintained at 27° C. The deposited wet films are rinsed with deionized water and baked for 15 minutes at 165° C. (object temperature).

4. Testing of the Resultant Paint Films

|  | A[1] | B[2] (comparison) |
|---|---|---|
| Film thickness (μm) | 20–22 | 20–22 |
| Flow-out[3] | 1.5 | 1.5 |
| Salt spray test[4] |  |  |
| undermigration (mm) | <1.8 | <1.5 |
| area rust | 0 | 0 |
| Humidity cycling test (according to VDA 621/415) |  |  |
| undermigration (mm) | <0.2 | <0.5 |
| area rust | 0 | 0 |
| Erichsen indentation | 6.0 | 5.5 |
| Bending[5] (cm) | 1 | 1–2 |
| Throwing power according to Ford (cm) | 21 | 20 |
| VW stone chip test[6] | 1 | 2 |

[1] Paint films prepared from lead-free electrocoating paint according to the invention
[2] Paint films prepared from lead-containing electrocoating paint (comparison example)
[3] Rating from 0 to 5; best: 0, worst: 5
[4] According to DIN 50021, duration: 360 hours, evaluation of results according to DIN 53 167
[5] Bending on conical mandrel according to ISO 6860 (0 = best)
[6] Rating from 0 to 10, best: 0, worst: 10

We claim:

1. A process for the coating of electrically conductive substrates, comprising the steps of
   (1) immersing the electrically conductive substrate in an aqueous electrocoating paint,
   (2) connecting the electrically conductive substrate to a direct current power supply so that the substrate acts as a cathode,
   (3) depositing a film on the substrate using direct current,
   (4) removing a substrate having a deposited paint film thereon from the electrocoating paint and
   (5) baking the deposited paint film,
wherein the aqueous electrocoating paint comprises 2 to 10%, by weight of an anticorrosive pigment based on zinc silicate and further including 1 to 15% by weight of a very fine quartz powder or cristobalite powder, wherein said powder is coated with epoxysilane or aminosilane, the percentages by weight being based on the total solids content of the electrocoating paint and wherein the anticorrosive pigment is prepared by fusing together 35 to 65% by weight of ZnO, 15 to 35% by weight of $SiO_2$ and up to 20% by weight of at least one compound selected from the group consisting of $B_2O_3$, $WO_3$, $MoO_3$, $SnO_2$, and mixtures thereof, the percentages by weight always totaling 100.

2. The process as claimed in claim 1 wherein the electrocoating paint comprises as binder a cationic amine-modified epoxy resin or a mixture of cationic amine-modified epoxy resins.

3. The process as claimed in claim 1 wherein the electrocoating paint comprises as crosslinking agent a blocked polyisocyanate or a mixture of blocked polyisocyanates.

4. The process as claimed in claim 1 wherein the anticorrosive pigment is prepared by fusing together components including 40 to 60% by weight of ZnO, 15 to 25% by weight of $SiO_2$, 5 to 20% by weight of $B_2O_3$ and components selected from the group consisting of 5 to 10% by weight of $WO_3$, 5 to 15% by weight of $MoO_3$, 5 to 10% by weight of $SnO_2$, and mixtures thereof, the components being fused together in such a manner that the percentages by weight always total 100.

5. The process as claimed in claim 1 wherein the anticorrosive pigment is prepared by fusing together 50 to 57% by weight of AnO, 25 to 32% by weight of $SiO_2$, 9 to 12% by weight of $B_2O_3$ and 6 to 9% by weight of $WO_3$, the components being fused together in such a manner that the percentages by weight always total 100.

6. The process as claimed in claim 1 wherein the anticorrosive pigment is prepared by fusing together 53 to 54% by weight of ZnO, 28 to 29% by weight of $SiO_2$, 10 to 11% by weight of $B_2O_3$ and 7 to 8% by weight of $WO_3$, the components being fused together in such a manner that the percentages by weight always total 100.

7. A cathodically depositable aqueous electrocoating paint, which comprises 2 to 10% by weight of an anticorrosive pigment based on zinc silicate and further comprising 1 to 15% by weight of very fine quartz powder or cristobalite powder, wherein said powder is coated with epoxysilane or aminosilane, the precentages by weight being based on the total solids content of the electrocoating paint and the anticorrosive pigment being prepared by fusing together 35 to 65% by weight of ZnO, 15 to 35% by weight of $SiO_2$, and up to 20% by weight of compounds selected from the group consisting of $B_2O_3$, $WO_3$ $MoO_3$, $SnO_2$ and mixtures thereof, the percentages totaling 100.

8. The electrocoating paint as claimed in claim 7 wherein the electrocoating paint comprises as binder a cationic amine-modified epoxy resin or a mixture of cationic amine-modified epoxy resins.

9. The electrocoating paint as claimed in claim 7 wherein the electrocoating paint comprises as crosslinking agent a blocked polyisocyanate or a mixture of blocked polyisocyanates.

10. The electrocoating paint as claimed in claim 7 wherein the anticorrosive pigment is prepared by fusing together components including 40 to 60% by weight of ZnO, 15 to 25% by weight of $SiO_2$, 5 to 20% by weight of $B_2O_3$ and a component selected from the group consisting of 5 to 10% by weight of $WO_3$, 5 to 15% by weight of $MoO_3$, 5 to 10% by weight of $SnO_2$ and mixtures thereof, the components being fused together in such a manner that the percentages by weight always total 100.

11. The electrocoating paint as claimed in claim 7, wherein the anticorrosive pigment is prepared by fusing together components including 50 to 57% by weight of ZnO, 25 to 32%, by weight of $SiO_2$, 9 to 12% by weight of $B_2O_3$ and 6 to 9% by weight of $WO_3$, the components being fused together in such a manner that the percentages by weight always total 100.

12. The electrocoating paint as claimed in claim 7, wherein the anticorrosive pigment is prepared by fusing together components including 53 to 54% by weight of ZnO, 28 to 29% by weight of $SiO_2$, 10 to 11% by weight of $B_2O_3$ and 7 to 8% by weight of $WO_3$, the components being fused together in such a manner that the percentages by weight always total 100.

13. A cathodically depositable aqueous electrocoating paint, which comprises 4 to 6% by weight of an anticorrosive pigment based on zinc silicate and further comprising 2 to 4% by weight of very fine quartz powder or cristobalite powder, wherein said powder is coated with epoxysilane or aminosilane, the percentages by weight being based on the total solids content of the electrocoating paint and the anticorrosive pigment being prepared by fusing together 35 to 65% by weight of ZnO, 15 to 35% by weight of $SiO_2$, and up to 20% by weight of compounds selected from the group consisting of $B_2O_3$, $WO_3$, $MoO_3$, $SnO_2$ and mixtures thereof, the percentages by weight always totaling 100.

* * * * *